(12) United States Patent
Otani et al.

(10) Patent No.: US 7,933,001 B2
(45) Date of Patent: Apr. 26, 2011

(54) GEOGRAPHIC DATA COLLECTING SYSTEM

(75) Inventors: Hitoshi Otani, Itabashi-ku (JP); Atsushi Tanahashi, Itabashi-ku (JP); Hiroshi Inaba, Itabashi-ku (JP); Takeshi Ishida, Itabashi-ku (JP); Junki Kaneko, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/474,809

(22) Filed: Jun. 26, 2006

(65) Prior Publication Data

US 2007/0008515 A1   Jan. 11, 2007

(30) Foreign Application Priority Data

Jul. 11, 2005 (JP) ................................. 2005-202047
Mar. 14, 2006 (JP) ................................. 2006-069804

(51) Int. Cl.
*G01C 5/00* (2006.01)
(52) U.S. Cl. ............................ 356/3.14; 356/3; 356/4.01
(58) Field of Classification Search .............. 356/3–5.15
See application file for complete search history.

(56) References Cited

U.S. PATENT DOCUMENTS

| | | | |
|---|---|---|---|
| 4,717,251 A | 1/1988 | Wells et al. ........................ 356/4 |
| 5,098,185 A | 3/1992 | Watanabe et al. ............ 356/4.01 |
| 5,361,217 A | 11/1994 | Makimura et al. ............ 364/561 |
| 5,539,513 A * | 7/1996 | Dunne ......................... 356/5.01 |
| 5,671,451 A | 9/1997 | Takahashi et al. ............ 396/310 |
| 5,699,149 A * | 12/1997 | Kuroda et al. ............... 356/4.01 |
| 5,699,444 A * | 12/1997 | Palm ............................. 382/106 |
| 5,913,078 A | 6/1999 | Kimura et al. .................. 396/50 |
| 5,988,862 A | 11/1999 | Kacyra et al. |
| 6,025,790 A | 2/2000 | Saneyoshi ..................... 340/946 |
| 6,396,571 B2 | 5/2002 | Ohtomo et al. ................ 356/5.1 |
| 6,563,574 B2 | 5/2003 | Ohtomo et al. |
| 6,859,269 B2 | 2/2005 | Ohtomo et al. ............. 356/4.01 |
| 2003/0065446 A1* | 4/2003 | Ootomo et al. .................... 702/5 |
| 2003/0105400 A1* | 6/2003 | Yawata et al. ................ 600/437 |

(Continued)

FOREIGN PATENT DOCUMENTS

EP   0 542 561   5/1993

(Continued)

OTHER PUBLICATIONS

European Search Report dated Apr. 8, 2008.

(Continued)

*Primary Examiner* — Thomas H Tarcza
*Assistant Examiner* — Timothy A Brainard
(74) *Attorney, Agent, or Firm* — Nields, Lemack & Frame, LLC

(57) ABSTRACT

A geographic data collecting system, comprising a distance measuring unit for projecting a distance measuring light and for measuring a distance to an object to be measured, a camera for taking an image in measuring direction, a display unit for displaying the pickup image, a touch panel provided to correspond to a screen position of the display unit, a tilt sensor for detecting a tilting of the measuring direction, and an arithmetic unit for calculating a distance to the object to be measured by giving consideration on the tilting in the measuring direction and a point-to-point distance as specified on the image by specifying two or more points of the object to be measured on a displayed image via the touch panel.

4 Claims, 10 Drawing Sheets

U.S. PATENT DOCUMENTS

| | | | |
|---|---|---|---|
| 2003/0179361 A1* | 9/2003 | Ohtomo et al. | 356/4.01 |
| 2006/0167648 A1 | 7/2006 | Ohtani | 702/150 |
| 2007/0133012 A1 | 6/2007 | Euler | 356/614 |

FOREIGN PATENT DOCUMENTS

| | | |
|---|---|---|
| EP | 1 219 925 | 7/2002 |
| JP | 2000-131065 | 5/2000 |
| JP | 2001-503134 | 3/2001 |
| JP | 2002-039748 | 2/2002 |
| JP | 2004-317237 | 11/2004 |
| WO | 98/10246 | 3/1998 |

OTHER PUBLICATIONS $3^{rd}$ Tech; DeltaSphere-3000 Brochure; Jun. 22, 2000.

Office Action dated Sep. 17, 2003 and Notice of Allowance dated Oct. 21, 2004 in U.S. Appl. No. 10/387,874.

Office Action ,dated Sep. 5, 2008 in U.S. Appl. No. 11/204,638.

OA dated Nov. 12, 2009 in co-pending U.S. Appl. No. 11/204,638.

Office Action dated Jun. 7, 2010 in co-pending U.S. Appl. No. 11/204,638.

* cited by examiner

FIG. 11
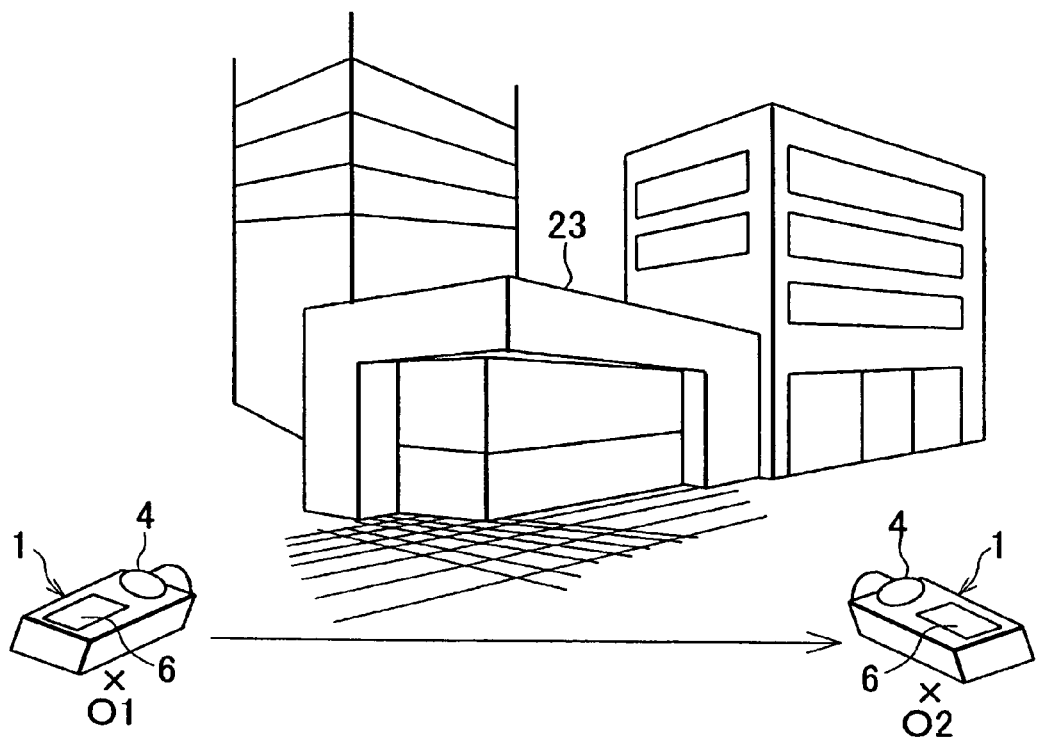
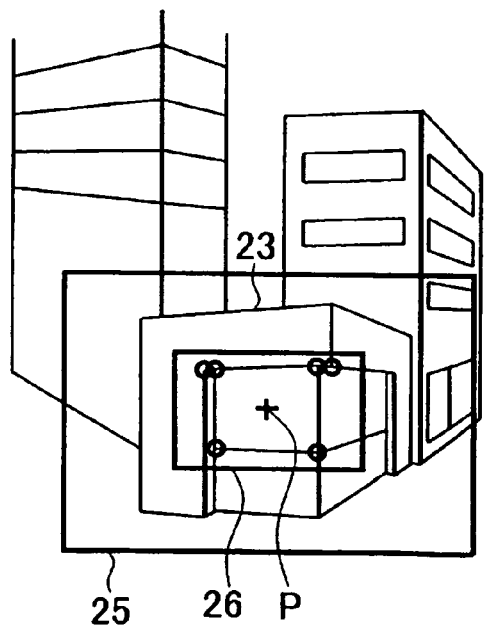
FIG. 12 (A)
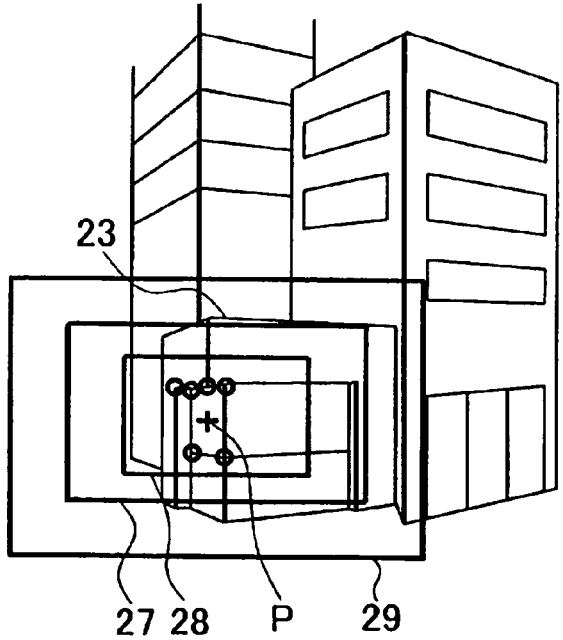
FIG. 12 (B)

GEOGRAPHIC DATA COLLECTING SYSTEM

BACKGROUND OF THE INVENTION

The present invention relates to a portable type geographic data collecting system, and in particular, relates to a geographic data collecting system, by which it is possible to acquire an image data of a measuring point, to specify the measuring point in the image, to perform measurement, etc. while visually confirming the measuring point, and to collect the measurement result together with the image data.

In recent years, a navigation system using an electronic map has been propagated. The navigation system is provided on vehicles or provided on handy phones(cellular phones) as additional function and is used.

With the propagation of the navigation system, geographic data required for electronic map has also been increasingly diversified, and there are strong demands on more precise and minute geographic data and on symbol marks, 3-dimensional images, etc. which should be added to the map to facilitate visual checking.

For instance, in order to collect geographic data to be transferred on an electronic map, operators must go to an operation site and must take images of public buildings, telephone poles, public telephones, etc., which serves as signs and marks, by using an image pickup unit such as a camera and the images are acquired.

To transfer the data to the map, coordinate data on ground surface is required. For the purpose of acquisition of the data on positions of buildings or telephone poles and positions of public telephones, an object to be measured is performed conventionally by surveying instruments and systems.

In the past, as a measuring system for acquiring an image on an object to be measured and for conveniently measuring a position of the object to be measured, a system described in the Japanese Patent Publication JP-A-2004-317237 has been known.

The measuring system described in JP-A-2004-317237 comprises a GPS (Global Positioning System), and it is possible to continuously perform measurement on topography and on objects on the ground surface without using reference points. The measuring system comprises an image pickup device and performs matching of an image taken with a result of surveying, and coordinate data with the image can be acquired.

By the measuring system as described above, measurement data and image data can be acquired with high accuracy. For the geographic data to be transferred to the electronic map, very high accuracy for the map is not required. To acquire geographic data by the measuring system, the measuring system is moved sequentially and is installed at a position as necessary. However, for the acquisition of the geographic data, many processes are required such as measurement of a distance to the object to be measured, measurement of a vertical angle, measurement of a horizontal angle, taking of an image, matching of the image with the measurement data, etc. This is not suitable for the case where many geographic data must be acquired within short time.

A portable type distance measuring system is described in the JP-A-2002-39748 as a distance measuring system for convenient measurement of distance. Because this portable type distance measuring system is not provided with an image pickup device, and it is difficult to specify a measuring point on an object to be measured. Because an image of the object to be measured cannot be acquired, for the purpose of acquiring geographic data to be transferred to an electronic map, it is necessary to acquire an image separately by using an image pickup device. As a result, complicated procedure such as matching of the acquired images with measurement data are needed.

SUMMARY OF THE INVENTION

It is an object of the present invention to provide a geographic data collecting system, by which it is possible to acquire an image of an object to be measured, to measure a distance to the object to be measured and also to specify measuring points in the image, and further, to facilitate the collecting of geographic data with image and to simplify the procedure to acquire image data and to perform measurement on the object to be measured.

To attain the above object, the present invention provides a geographic data collecting system, comprising a distance measuring unit for projecting a distance measuring light and for measuring a distance to an object to be measured, a camera for taking an image in measuring direction, a display unit for displaying the pickup image, a touch panel provided to correspond to a screen position of the display unit, a tilt sensor for detecting a tilting of the measuring direction, and an arithmetic unit for calculating a distance to the object to be measured by giving consideration on the tilting in the measuring direction and a point-to-point distance as specified on the image by specifying two or more points of the object to be measured on a displayed image via the touch panel. Also, the present invention provides the geographic data collecting system as described above, further comprising a GPS unit for measuring a coordinate position and an azimuth sensor for detecting a measuring direction, and the arithmetic unit calculates the coordinate position of the object to be measured based on the measured coordinate position, a detected azimuth, and a measured distance to the object to be measured. Further, the present invention provides the geographic data collecting system as described above, further comprising a receiving unit for receiving a correction information for correcting the measured value of the GPS unit, wherein the arithmetic unit calculates the coordinate position of the object to be measured based on the measured value corrected by the correction information. Also, the present invention provides the geographic data collecting system as described above, wherein the correction information is received by a handy phone and is transmitted by the transmitting function of the handy phone. Further, the present invention provides the geographic data collecting system as described above, wherein a cursor is displayed on the displayed image, the cursor indicates a center of a measurement, the cursor on the image with the object to be measured, a measurement of the distance is performed by projecting the distance measuring light from the distance measuring unit. Also, the present invention provides the geographic data collecting system as described above, wherein the distance measuring light projected for the measurement is a visible light.

Also, the present invention provides a geographic data collecting system, which comprises a GPS unit for measuring a coordinate position, a distance measuring unit for projecting a distance measuring light and for measuring a distance to an object to be measured, a camera for taking an image in measuring direction, a display unit for displaying the pickup image, a touch panel provided to correspond to a screen position of the display unit, and an arithmetic unit for calculating a coordinate position of the first measuring point based on a first image and a second image including a first measuring point acquired at a first geographic point and a second geographic point by the camera, based on coordinate positions of the first geographic point and the second geographic point measured by the GPS unit and based on a distance from the first geographic point to the first measuring point measured by the distance measuring unit and a distance from the second geographic point to the first measuring point measured by the distance measuring unit, for calculating a coordinate position of the second measuring point specified by the touch panel on at least one of the first image and the second image based on positional relation on the image, and for calculating a distance between the first measuring point and the second measuring point. Further, the present invention provides the geographic data collecting system as described above, wherein the second measuring point is a point on the image specified on a vertical line of the first measuring point. Also, the present invention provides the geographic data collecting system as described above, wherein an area enclosed by a vertical line and a horizontal line is calculated by specifying at least a third measuring point in a horizontal direction of the first measuring point or the second measuring point.

Further, the present invention provides a geographic data collecting system, comprising a GPS unit for measuring a coordinate position, a distance measuring unit for projecting a distance measuring light and for measuring a distance to an object to be measured, a camera for taking an image in measuring direction, a display unit for displaying the pickup image, and an arithmetic unit for calculating a coordinate position of the measuring point based on a first image including a measuring point acquired at a first geographic point by the camera, a second image including the measuring point specified by following from the first image by processing of image matching acquired at the second geographic point, a coordinate position of the first geographic point and the second geographic point measured by the GPS unit, and based on a distance from the first geographic point to the measuring point measured by the distance measuring unit and on a distance from the second geographic point to the measuring point.

According to the present invention, it is possible to provide a geographic data collecting system, comprising a distance measuring unit for projecting a distance measuring light and for measuring a distance to an object to be measured, a camera for taking an image in measuring direction, a display unit for displaying the pickup image, a touch panel provided to correspond to a screen position of the display unit, a tilt sensor for detecting a tilting of the measuring direction, and an arithmetic unit for calculating a distance to the object to be measured by giving consideration on the tilting in the measuring direction and a point-to-point distance as specified on the image by specifying two or more points of the object to be measured on a displayed image via the touch panel. As a result, operation can be confirmed and performed on the image, and measuring operation can be performed without performing complicated procedure, and image data with a distance measurement data can be collected in simple and easy manner.

BRIEF DESCRIPTION OF THE DRAWINGS

FIG. 11 is a drawing to explain a measuring operation in a fourth embodiment of the present invention;

FIG. 12 (A) and FIG. 12 (B) each represents a drawing to explain an image acquired in the measuring operation.

DETAILED DESCRIPTION OF THE PREFERRED EMBODIMENTS

Figure 1:
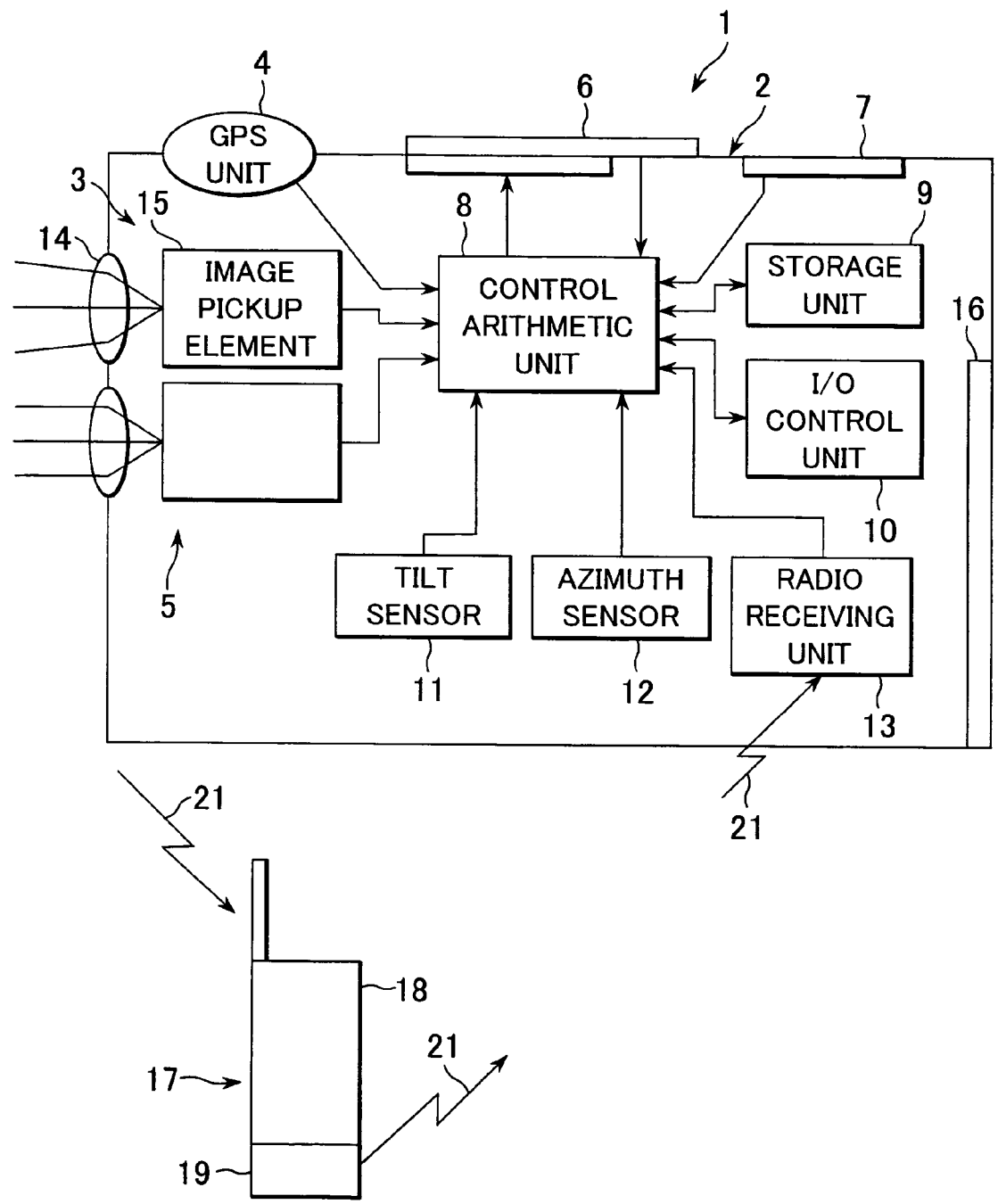
FIG. 1 is a schematical block diagram of an embodiment of the present invention.

Description will be given below on the best mode for carrying out the present invention referring to the drawings.

Referring to FIG. 1, description will be given on a geographic data collecting system 1 according to the present invention.

In the figure, reference numeral 2 denotes a portable type housing. In the housing 2, there are provided an image pickup unit 3, a GPS unit 4, a distance measuring unit 5, a display unit 6, and an operation unit 7. Inside the housing 2, there are provided a control arithmetic unit 8, a storage unit 9, an input/output control unit 10, a tilt sensor 11, an azimuth sensor 12, and a radio receiving unit 13. The image pickup unit 3 comprises an objective lens 14 and an image pickup element 15 comprising an assembly a multiple pixels such as a CCD, a CMOS sensor, etc. The image pickup element 15 can specify address of each individual pixel (position in the image pickup element). An image of an object formed in the image pickup element 15 is outputted to the control arithmetic unit 8 as a digital image signal from the image pickup element 15 and the image is stored in the storage unit 9 via the control arithmetic unit 8. In the figure, reference numeral 16 denotes a chargeable battery or a dry cell used as a power source for the geographic data collecting system 1.

The distance measuring unit 5 comprises a non-prism type electro-optical distance measuring system. A distance measuring light is projected to an object to be measured, and a distance to the object to be measured can be measured by receiving a reflection light from the object to the measured.

The display unit 6 displays the image thus picked up and also serves as a touch panel, and an operator can perform processing as necessary by the display unit 6. The operation unit 7 is provided with operation buttons as necessary (not shown), such as a power on/off button to turn a power source on or off, a shutter button to perform image pickup operation, and a display switchover button to switch over a screen, a measuring button to perform measurement, etc. so that processing as necessary can be carried out.

Figure 2:
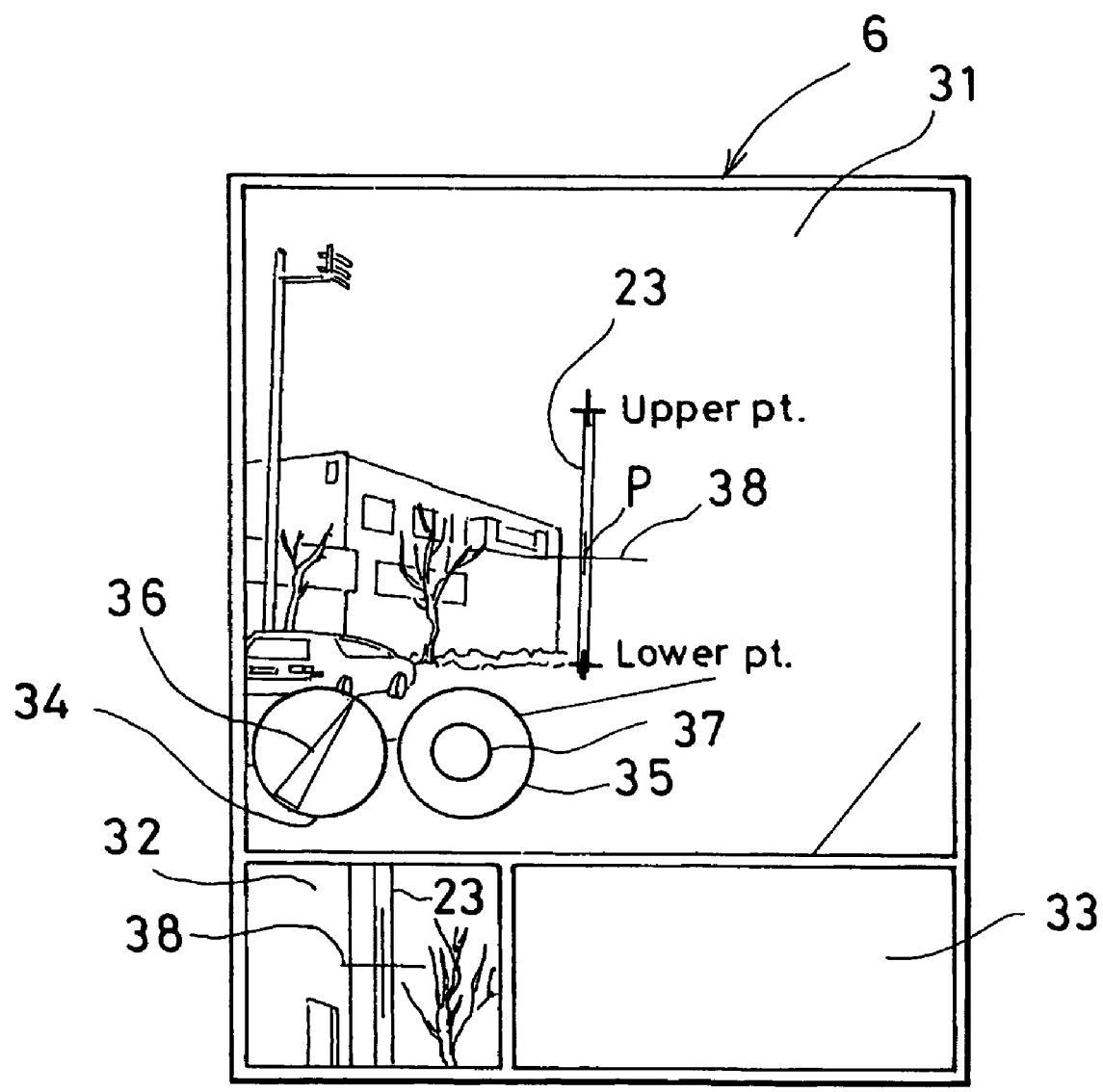
FIG. 2 is a drawing to explain an example of a display unit to be used in a measuring system according to the present invention.

FIG. 2 shows an example of the display unit 6. A display screen of the display unit 6 comprises a main screen 31, a first sub-screen 32, a second sub-screen 33, etc. For instance, an image in wide range in the measuring direction is displayed on the main screen 31, and an enlarged view of a region near the measuring point is displayed on the first sub-screen 32, and character information such as measuring distance, measuring direction, etc. is displayed on the second sub-screen 33. Details of display on each of these screens can be changed by switching the screens. For instance, the enlarged view of the region near the measuring point can be displayed on the main screen 31, and an image in wide range in the measuring direction can be displayed on the first sub-screen 32.

The main screen 31 comprises an azimuth display unit 34 and a tilt display unit 35. An azimuth in the measuring direction is displayed on the azimuth display unit 34. When a needle 36 in the azimuth display unit 34 is directed in the direction right above, it means that the measuring direction is in the right north. On the tilt display unit 35, tilting state of the geographic data collecting system 1 is displayed. When a small circle 37 in the tilt display unit 35 is positioned at the center, it is indicated that the geographic data collecting system 1 is in horizontal state.

A measuring point is indicated by a cursor 38 (represented by a cross in the figure) in the main screen 31 and in the fist sub-screen 32.

The storage unit 9 has a storage medium (not shown), and data can be written or read via the control arithmetic unit 8. In the storage medium, various types of programs for operating the geographic data collecting system 1 are stored such as a sequence program for performing measurement, an image processing program for processing the image taken, a measurement correcting program for correcting measurement data measured by GPS based on a correction information (to be described later), a program for displaying data and the image on the display unit 6, etc. The storage medium may comprise an internal storage medium fixedly incorporated in the geographic data collecting system 1, such as a semiconductor memory, a HD, and a portable storage medium removably adopted to the storage unit 9. As the portable storage medium, a compact size storage medium, etc. represented by a memory card is used, which can be accommodated in the geographic data collecting system 1. As an auxiliary storage unit, an external storage unit, etc. such as an external HD unit which is connectable to the geographic data collecting system 1 may be used.

The input/output control unit 10 can be connected to an external processing unit such as a personal computer (PC), and the data stored by the storage unit 9 can be outputted via the input/output control unit 10. Also, data can be inputted from the PC via the input/output control unit 10, and various types of programs as described above can be written or rewritten. Geographic data including at least the data at a geographic point of the object to be measured should be inputted to the storage unit 9 via the input/output control unit 10.

The tilt sensor 11 detects a tilting of the geographic data collecting system 1 to horizontal direction during distance measuring operation or during data collecting operation and inputs the tilting data to the control arithmetic unit 8. The control arithmetic unit 8 displays the tilting state on the tilt display unit 35.

The azimuth sensor 12 detects direction of optical axis of the objective lens 14, i.e. image pickup direction of the image pickup unit 3, i.e. the measuring direction. The result of the detection is inputted to the control arithmetic unit 8, and the control arithmetic unit 8 displays the azimuth on the azimuth display unit 34.

The radio receiving unit 13 receives a correction information for GPS measurement to be transmitted from a correction information transmitter/receiver 17 (to be described later), and the correction information is outputted to the control arithmetic unit 8.

Generally speaking, in the position measurement based on the GPS unit alone, there are causes to induce errors due to propagation delay in the ionosphere or in the atmosphere, and the measurement accuracy is in the range of about 10 m to 50 m. For this reason, D-GPS (Differential DPS), or RTK-GPS (Real-Time Kinetic GPS) with higher measurement accuracy. In the D-GPS, measurement accuracy can be improved to the range of several tens of cm to several meters by correction information using electric waves of FM broadcasting issued from a standard station with its position known or using medium wave bacon. In the RTK-GPS, signals received and acquired at the same time at a fixed point used as the standard and at a moving point are transferred to the moving point via a radio system or the like, and the position is determined at the moving point. As a result, the measurement accuracy is improved to the range of about 1-2 cm. In a VRS-GPS (Virtual Reference System GPS), a condition as if a reference point is near the site of surveying is created from observation data at two or more electronic reference points, and surveying with high accuracy can be carried out by using a single RTK-GPS receiver. The system according to the present invention is a compact size integrated type geographic data collecting system of handy type. When strict accuracy is not required, it is preferable to use the D-GPS unit, for instance, as described above, which is easier to use.

The correction information transmitter/receiver 17 comprises a correction information receiver 18 and a correction information transmitter 19. A correction information 21 can be received by a handy phone, and the handy phone can be conveniently used as the correction information receiver 18. Also, the correction information 21 received by the correction information receiver 18 may be transmitted to the radio receiving unit 13 by utilizing the transmitting function of the handy phone. Or the correction information transmitter 19 may be installed as shown in the figure, and the correction information 21 may be transmitted to the radio receiving unit 13 by the correction information transmitter 19. Some types of handy phones have Bluetooth function, and Bluetooth radio system suitable for large capacity transmission for near distance may be used for the transmitting the correction information 21.

Next, description will be given on a case where measurement and collecting geographic data are performed in the geographic data collecting system 1.

Embodiment 1

Figure 3:
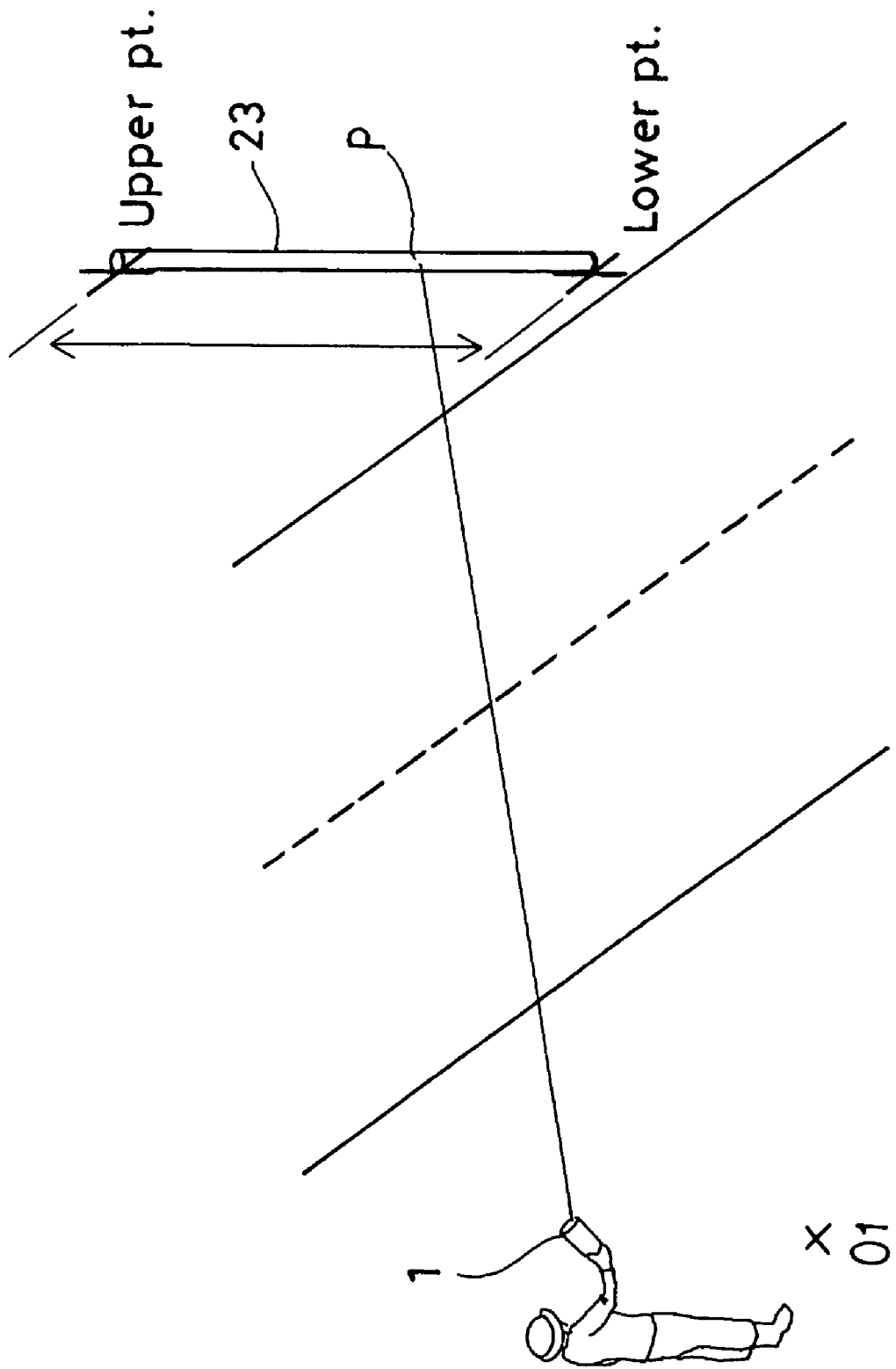
FIG. 3 is a perspective view to show measuring operation of a first embodiment according to the present invention.
Figure 4:
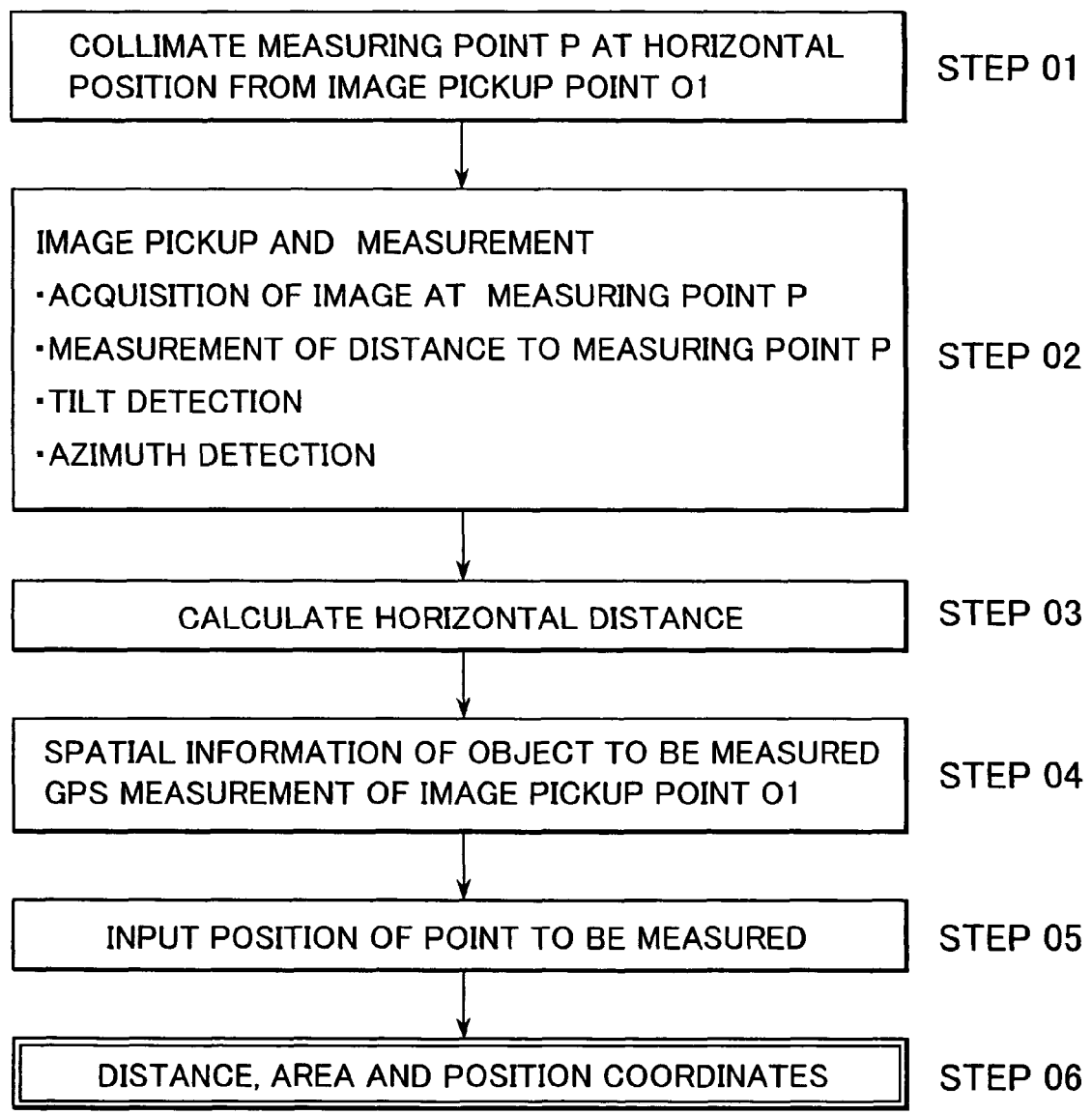
FIG. 4 is a flow chart to show operation in a first embodiment of the present invention.
Figure 5:
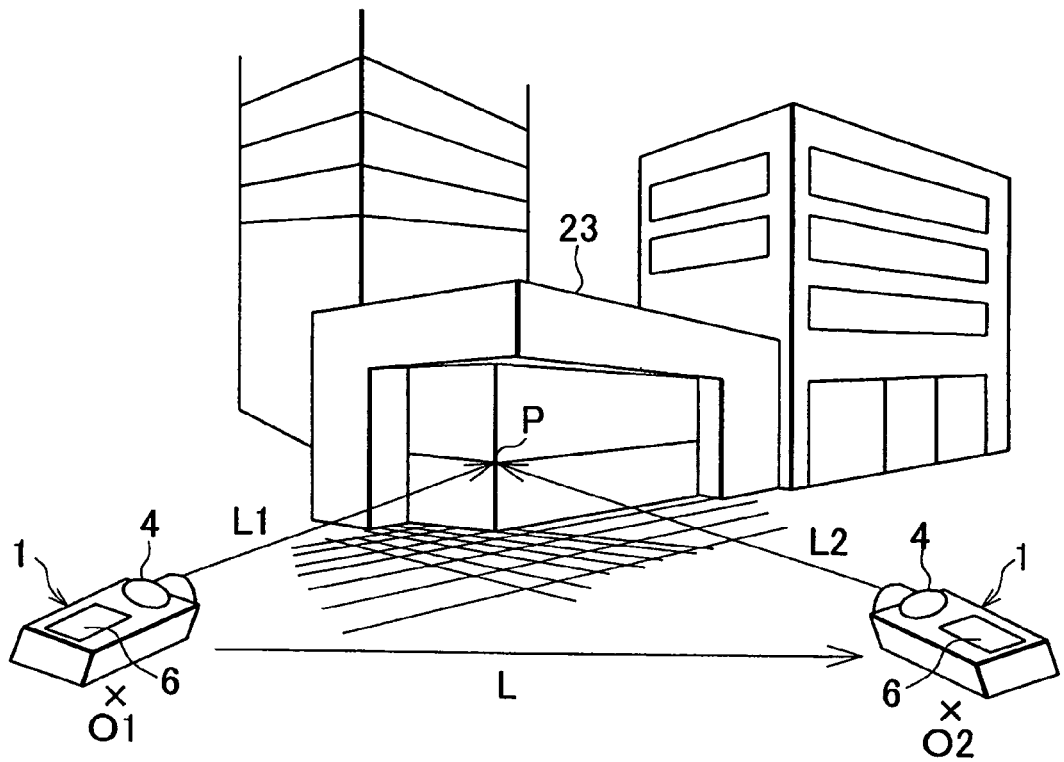
FIG. 5 is a perspective view to show a measuring operation of a second embodiment of the present invention.
Figure 6:
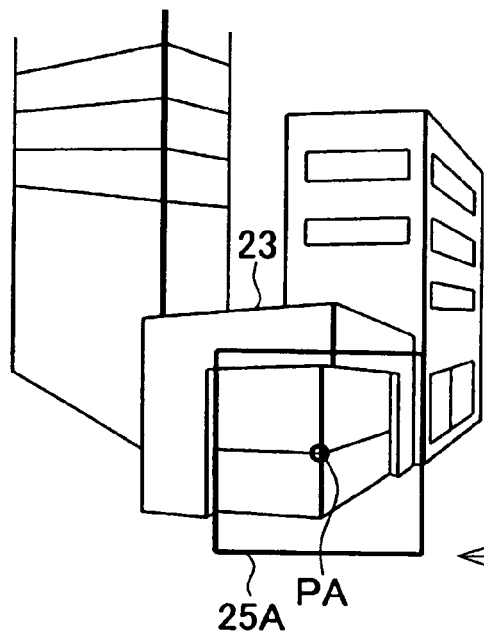
FIG. 6 (A) and FIG. 6 (B) each represents a drawing to explain an image acquired by the measuring operation.
Figure 6:
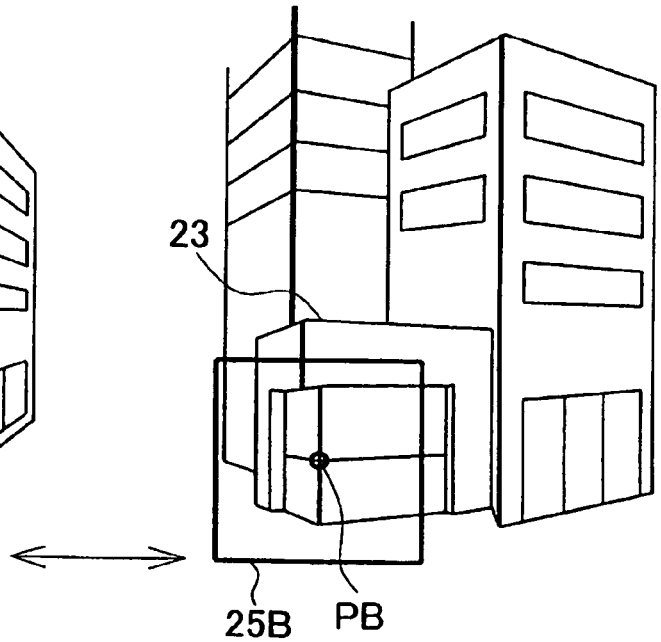
Figure 7:
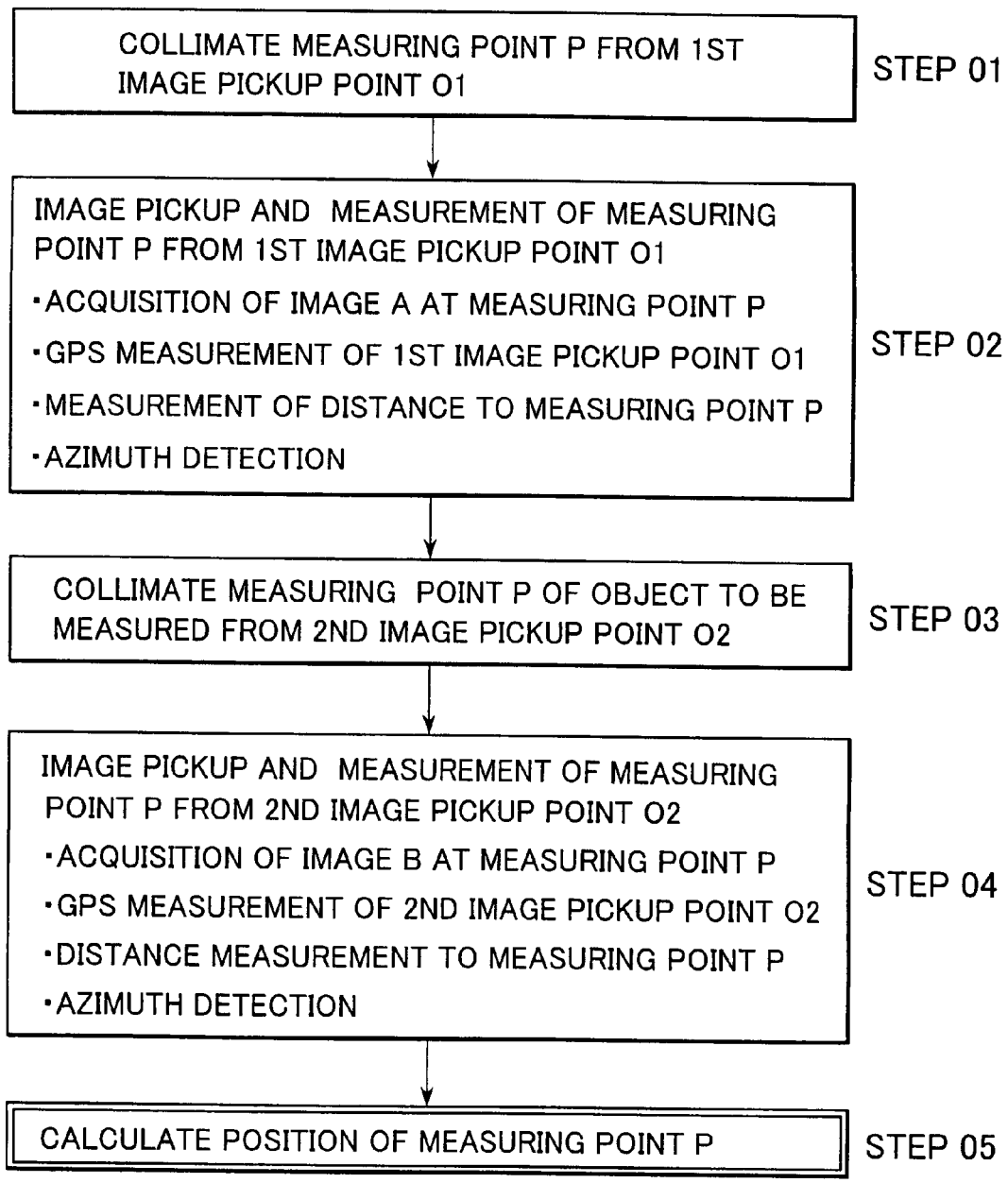
FIG. 7 is a flow chart to show operation in a second embodiment of the present invention.
Figure 8:
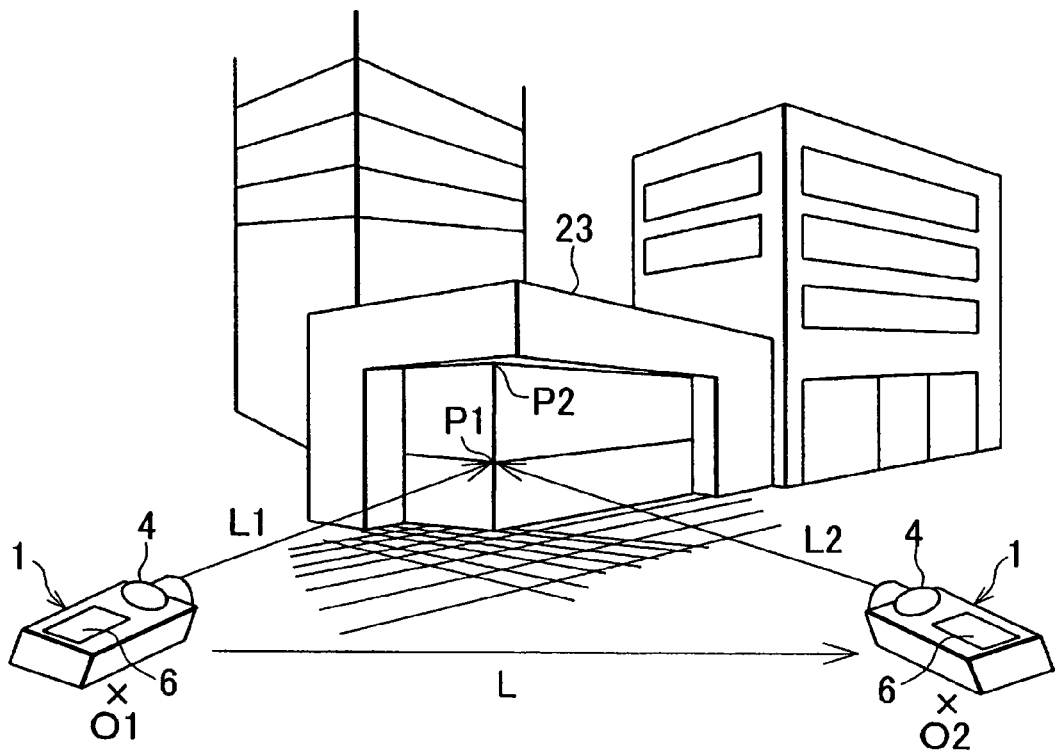
FIG. 8 is a drawing to explain a measuring operation in a third embodiment of the present invention.
Figure 9:
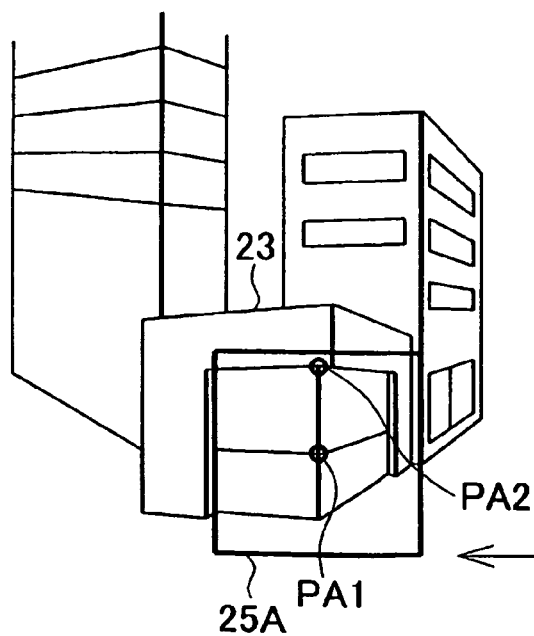
FIG. 9 (A) and FIG. 9 (B) each represents drawing to explain an image acquired in the measuring operation.
Figure 9:
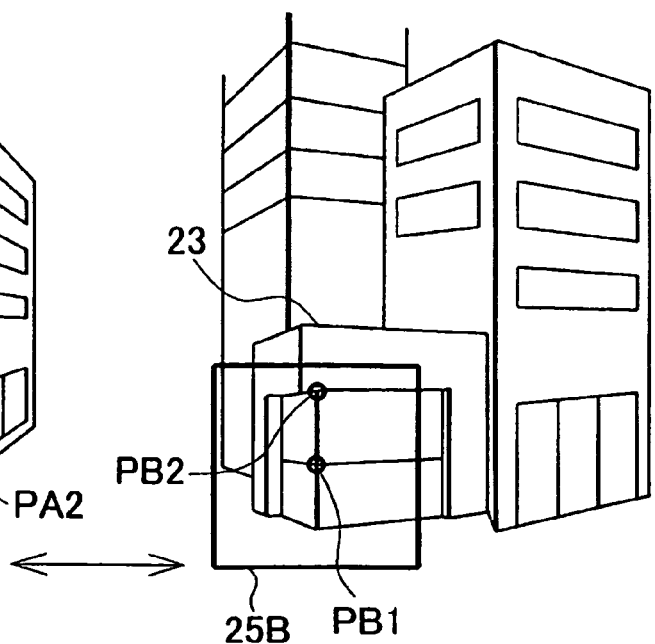
Figure 10:
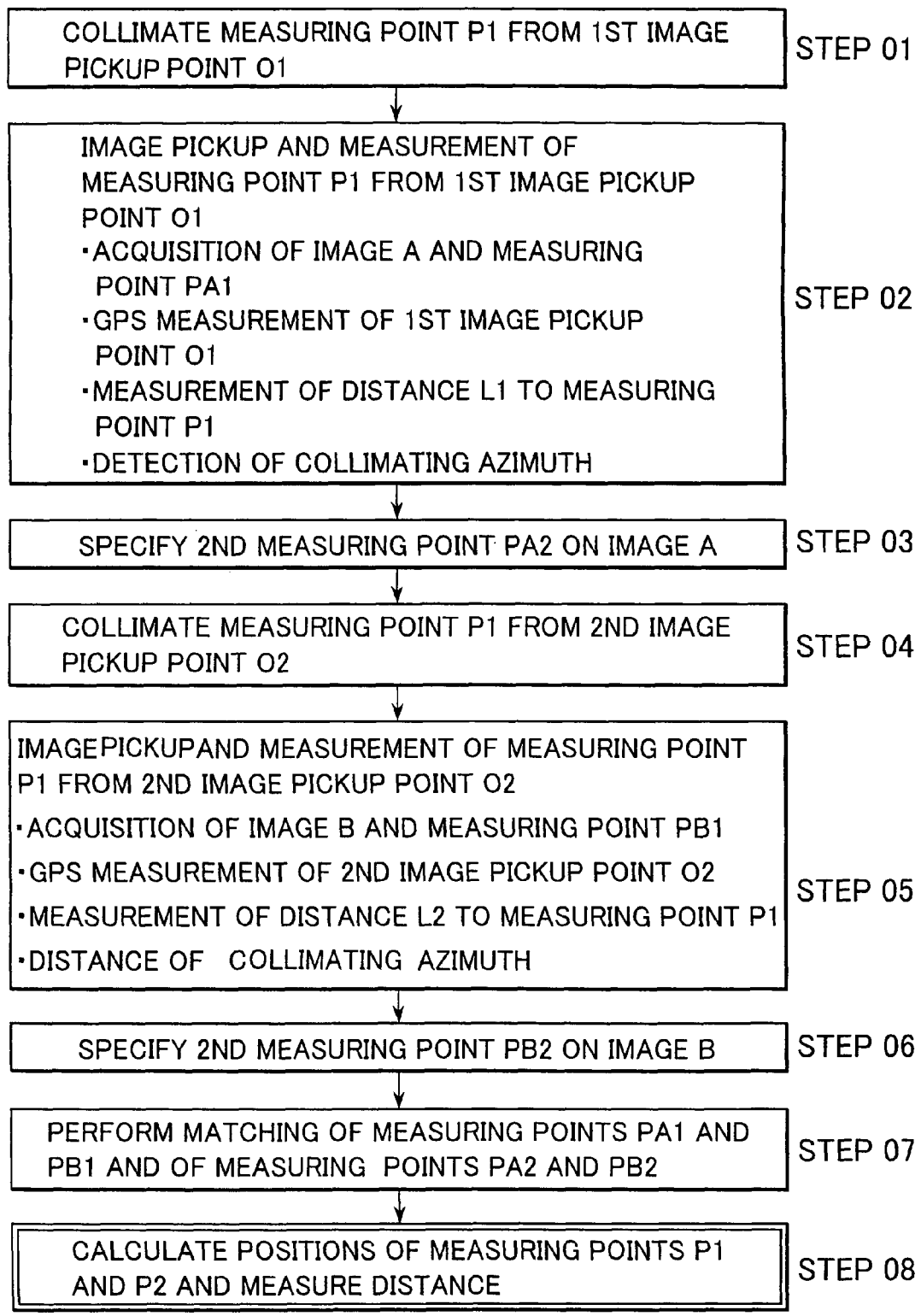
FIG. 10 is a flow chart to show the third embodiment according to the present invention.
Figure 13:
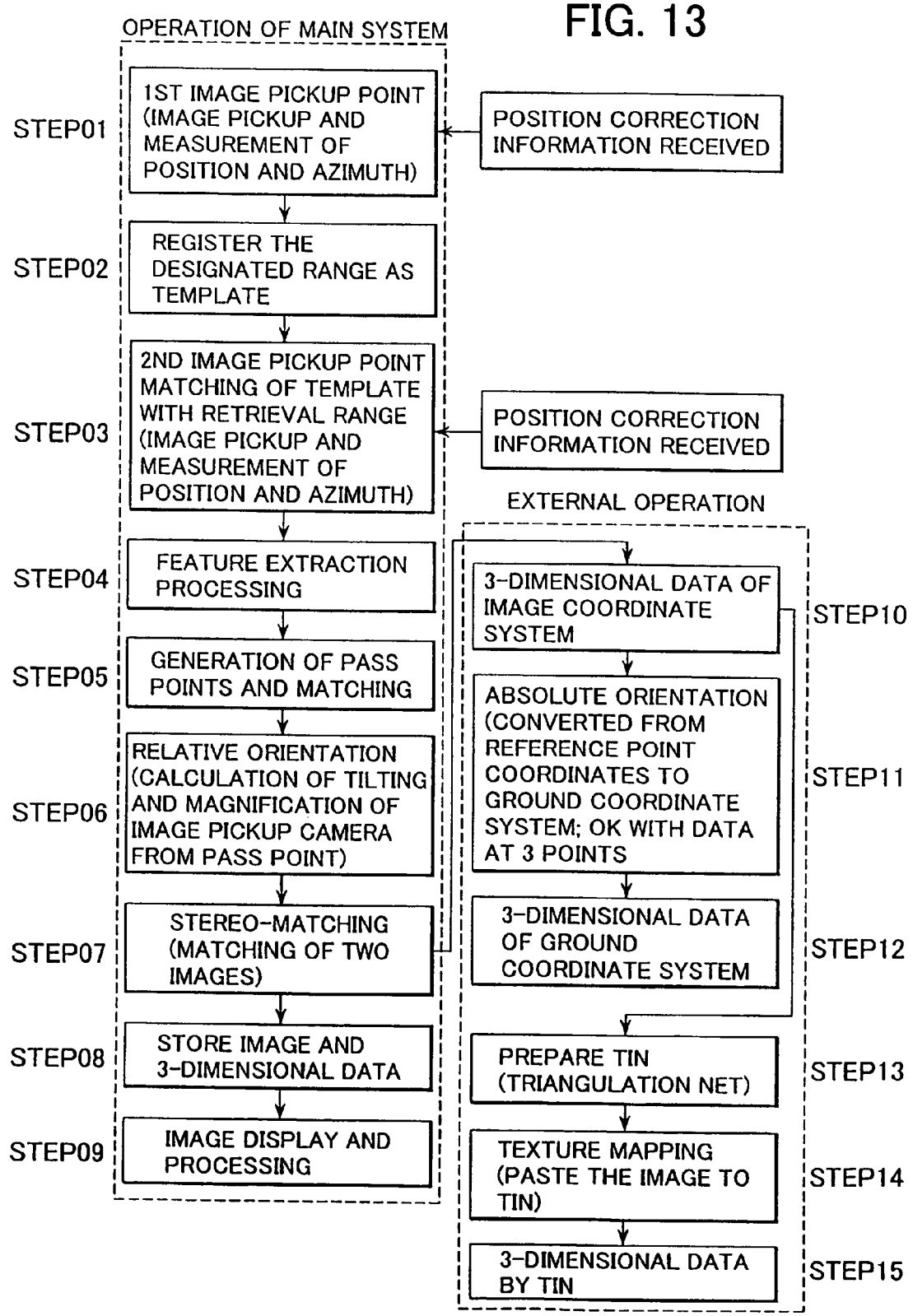
FIG. 13 is a flow chart to show operation in the fourth embodiment of the present invention.

Description will be given on the measurement relating to an object to be measured 23 by referring to FIG. 3 and FIG. 4. The measurement given below indicates a case where a telephone pole is selected as the object to be measured 23.

(Step 01) From an image pickup point O1, the geographic data collecting system 1 is directed toward the object to be measured 23, and the geographic data collecting system 1 is maintained at horizontal position. The geographic data collecting system 1 is directed toward the object to be measured 23. On the main screen 31, the cursor 38 is aligned with a measuring point P on the object to be measured 23 in an image displayed on the screen. The alignment condition of the cursor 38 to the object to be measured 23, is confirmed by an enlarged view on the first sub-screen 32.

(Step 02) When the measuring point P is determined, a distance measuring button (not shown) is operated by the operation unit 7, and distance measurement is carried out. A distance measuring light is projected, and distance measurement is performed to a measuring point of the object to be measured 23, and the result of distance measurement is stored in the storage unit 9. At the same time as the distance measurement, an image is acquired. Tilting and azimuth at the time of measurement are measured by the tilt sensor 11 and the azimuth sensor 12 respectively.

(Step 03) When a distance to the object to be measured 23 is measured, the measured distance is converted to horizontal distance based on the tilting measured by the tilt sensor 11.

(Step 04) Further, position coordinates (absolute coordinates) of the geographic data collecting system 1 at the time of measurement are obtained by the GPS unit 4, and coordinates of the measuring point are determined according to the measured distance, the position coordinates, and the azimuth measured by the azimuth sensor 12.

(Step 05) When a distance and the like on the object to be measured 23 is to be determined, the display unit 6 is used as a touch panel, and various types of measurement can be conducted through operation in the image. For instance, when a height of the object to be measured 23 is to be determined, distance calculation mode is selected from the operation unit 7, and a lower point (Lower pt.) of the object to be measured 23 is specified by a pointing device, e.g. a touch pen. Further, an upper point (Upper Pt.) of the object to be measured 23 is specified by touching. When the lower point and the upper point are specified, signals of the lower point and the upper point are inputted to the control arithmetic unit 8, and an angle of view is calculated. The angle of view can be obtained by calculating the number of pixels between the lower point and the upper point in the image pickup element 15.

(Step 06) By the distance to the object to be measured 23 and calculation by the angle of view on the figure—namely, by using trigonometric function, a distance between the lower point and the upper point, i.e. a height of the object to be measured 23, can be measured. Further, by specifying three or more points, the distance between the points can be measured respectively, and an area enclosed by the points can be calculated.

When a position in ground coordinate system (position in absolute coordinate system) of the object to be measured 23 is to be determined, the geographic data collecting system 1 is measured by the GPS unit 4. Based on the measurement results of the GPS unit 4 and azimuth measurement by the azimuth sensor 12, the position in the absolute coordinate system of the object to be measured 23 can be measured.

The measurement results as given above are associated with an image in the direction of the object to be measured 23, and the data are stored in the storage unit 9 together with the image. Because the measurement data relating to the measuring point are stored together with the image, the procedure of rearrangement and editing after data collecting can be carried out in simple and reliable manner.

In case optical system of the image pickup unit 3 and optical system of the distance measuring unit 5 are provided separately from each other, the center of the measured distance is deviated from the center of the image. For this reason, the relation between the image center and the distance measuring point with respect to the distance should be determined in advance. Further, the measurement with high accuracy can be performed in the peripheral region of the image by determining calibration which is a correction value of the image acquired by the image pickup unit 3 and real dimension. If it is designed in such manner that the image pickup unit 3 and the distance measuring unit 5 have the same optical system, and that the reflected light is split by a beam splitter and an image is taken by one of the luminous fluxes split, and distance is measured by the other of the luminous fluxes. Then, the optical axis of the image pickup system concurs with the optical axis of the distance measurement. As a result, the center of distance measurement concurs with the center of the image, and there is no need to perform the correction.

The measuring point can be confirmed by the display unit 6. By using a visible light as a distance measuring light projected from the distance measuring unit 5, and the projecting point can be confirmed, and this contributes to the improvement of working efficiency.

By changing the objects to be measured 23 one after another, the above measurement is performed, and the measured data are stored in the storage unit 9. As a result, geographic data can be collected.

Embodiment 2

Next, description will be given on a case where a single measuring point P on the object to be measured 23 is measured from two measuring points referring to FIG. 1 and FIG. 5 to FIG. 7.

(Step 01) From a first image pickup point O1, the object to be measured 23 is collimated by an image on the display unit 6. By setting a certain position of the object to be measured 23 as a measuring point P, the measuring point P is aligned with the cursor 38 (collimating position).

(Step 02) By operating a button on the operation unit 7, an image is taken from the first image pickup point O1 to the object to be measured 23, and an image 25A of the object to be measured 23 is acquired. The measuring point P is stored in the storage unit 9 as a measuring point PA of the image 25A. It is preferable that the measuring point P has specific features easy to identify, e.g. it is preferable that a point such as a window corner, an edge of a building, etc. is selected as the measuring point P.

At the same time as the acquisition of the image, a distance L1 (a distance in horizontal component from the first image pickup point O1 to the measuring point P) and a tilt angle in image pickup direction are measured. Position coordinates (absolute coordinates (X1, Y1, Z1)) of the first image pickup point O1 are measured by the GPS unit 4, and a first position data is acquired. Further, the correction information 21 is received by the correction information transmitter/receiver 17. The correction information 21 is transmitted from the correction information transmitter 19 to the radio receiving unit 13, and the correction information 21 is corrected to a first corrected position data by the measurement correcting program. The first corrected position data thus corrected is associated with the image 25A and is stored in the storage unit 9.

From the first image pickup point O1, collimating direction of the measuring point P is measured by the azimuth sensor 12, and the results of measurement are stored in the storage unit 9. As the result of the measurement of azimuth, it is easier to determine an azimuth that the image has been taken.

(Step 03) Now, moving to a second image pickup point O2, the geographic data collecting system 1 is directed toward the measuring point P of the object to be measured 23. While confirming the image on the display unit 6, it is collimated so that the measuring point P is aligned with the cursor 38.

It is difficult to align precisely the measuring point P with the cursor 38 by adjusting the direction of the geographic data collecting system 1. Thus, matching by the image is performed.

(Step 04) An image is taken under the condition that the measuring point P is collimated from the second image pickup point O2, and an image 25B is obtained. In the image 25B, a point corresponding to the measuring point P is represented as a measuring point PB, and the image 25B is stored in the storage unit 9.

Using an image of a small portion including the measuring point PA of the image 25A stored in the storage unit 9, matching with an image of a small portion including the measuring point PB in the image 25B is performed, and a position of the measuring point PB on the image 25B is identified. The matching is an image matching in small range. Thus, the burden on the control arithmetic unit 8 is low, and real-time image matching is possible. By performing the image matching at real time, it is possible to identify the measuring point PB and to follow the measuring point PB up. The position of the measuring point PB on the image 25B is detected, and a position of the measuring point PB with respect to the image center can be obtained. The position of the measuring point PB obtained is used by feedback to the calculation for orientation.

At the same time as the acquisition of the image, a distance L2 from the second image pickup point O2 to the measuring point P (a distance in horizontal component from the second image pickup point O2 to the measuring point P) and a tilt angle in image pickup direction are measured. Position coordinates (absolute coordinates (X2, Y2, Z2)) of the second image pickup point O2 are measured by the GPS unit 4, and a second position data is acquired. Further, the correction information 21 is received by the correction information transmitter/receiver 17. The correction information 21 is transmitted from the correction information transmitter 19 to the radio receiving unit 13, and the second position data is corrected to a second corrected position data by the measurement correcting program. The second corrected position data thus corrected is associated with the image 25B and the second corrected position data is stored in the storage unit 9. By the azimuth sensor 12, the image pickup direction is measured, and the image pickup direction is stored in the storage unit 9.

(Step 05) A distance L between the image pickup points, a distance L1 between the first image pickup point O1 and the measuring point P, and a distance L2 between the second image pickup point O2 and the measuring point P are calculated based on each position coordinates of the first image pickup point O1 and the second image pickup point O2. From the distance L, the distance L1 and the distance L2, position coordinates (XP, YP) at the measuring point P can be obtained. Further, based on a tilt angle to the measuring point P from the first image pickup point O1 or a tilt angle to the measuring point P from the second image pickup point O2, and based on the distance L1 or the distance L2, position coordinates (ZP) of the measuring point P can be obtained, and absolute coordinates (XP, YP, ZP) of the measuring point P can be identified. By specifying a point other than the measuring point P, using a touch pen, etc., on at least one of the image 25A or the image 25B, a distance between the two points can be obtained in similar manner as in Embodiment 1. By specifying two points or more further, an area can be calculated.

By changing the objects to be measured 23 one after another, the above measurement is performed, and the measured data are stored in the storage unit 9. As a result, geographic data can be collected.

Embodiment 3

Next, description will be given on a case where two or more measuring points P are measured on the object to be measured 23 from two measuring points and a length of straight line and an area of the object to be measured 23 are calculated by referring to FIG. 1 and FIG. 8 to FIG. 10.

(Step 01) The object to be measured 23 is collimated from the first image pickup point O1 in an image on the display unit 6. Required position on the object to be measured 23 is set as a measuring point P1, and the measuring point P1 is aligned with the cursor 38 (collimating position).

(Step 02) By operating a button on the operation unit 7, an image is taken from the first image pickup point O1 toward the object to be measured 23, and an image 25A is acquired on the object to be measured 23. The measuring point P1 is stored in the storage unit 9 as a measuring point PA1 of the image 25A. It is preferable that the measuring point P1 has specific features easy to identify. It is preferable that a point such as a window corner, an edge of a building, etc. is selected.

At the same time as the acquisition of the image, a distance L1 (a distance in horizontal component from the first image pickup point O1 to the measuring point P1) and a tilt angle in image pickup direction at the first image pickup point O1 are measured. By the GPS unit 4, position coordinates (absolute coordinates (X1, Y1, Z1)) of the first image pickup point O1 are measured, and a first position data is acquired. Further, the correction information 21 is received by the correction information transmitter/receiver 17. The correction information 21 is transmitted to the radio receiving unit 13 from the correction information transmitter 19, and the correction information 21 is corrected to a first corrected position data by the measurement correcting program. The first corrected position data thus corrected is associated with the image 25A and is stored in the storage unit 9.

Collimating direction of the measuring point P1 from the first image pickup point O1 is measured by the azimuth sensor 12, and a measured collimating direction is stored in the storage unit 9. As the result of the measurement of azimuth, it is now easier to determine azimuth that the image has been taken.

(Step 03) On the display unit 6 where the image 25A is displayed, another measuring point P2 is specified. By using a touch pen or the like, a measuring point P2 on a vertical line passing through the measuring point PA1 is specified on the image 25A. The measuring point P2 is stored in the storage unit 9 as a measuring point P2 in the image 25A. To obtain an area, in the image 25A, a measuring point PA3 and a measuring point P4 in horizontal direction respectively with respect to the measuring point PA1 and the measuring point PA2 are specified by using a touch pen or the like. The position data of the measuring point PA3 and the measuring point PA4 on the image are also stored in the storage unit 9 similarly to the cases of the measuring point PA1 and the measuring point PA2.

(Step 04) Moving now from the first image pickup point O1 to the second image pickup point O2, the geographic data collecting system 1 is directed toward the measuring point P1. While confirming the image on the display unit 6, the geographic data collecting system 1 is collimated so that the measuring point P1 is aligned with the cursor 38.

(Step 05) The measuring point P1 is collimated from a second image pickup point O2. By operating a button on the operation unit 7, an image is taken from the second image pickup point O2 toward the object to be measured 23, and an image 25B of the object to be measured 23 is acquired. The measuring point P1 is stored in the storage unit 9 as a measuring point PB1 of the image 25B. The measuring point P1 has specific features easier to identify like above mentioned. For instance, a point such as a window corner, an edge of a building, etc. is selected. As a result, it is easier to identify on the image 25B.

At the same time as the acquisition of the image, a distance L2 (a distance in horizontal component from the second image pickup point O2 to the measuring point P1) and a tilt angle in image-taking direction at the second image pickup point O2 are measured. Position coordinates (absolute coordinates (X2, Y2, Z2)) of the second image pickup point O2 are determined by the GPS unit 4, and a second position data is acquired. Further, a correction information 21 is received by the correction information transmitter/receiver 17, and the correction information 21 is transmitted from the correction information transmitter 19 to the radio receiving unit 13, and the correction information 21 is corrected to a second corrected position data by the measurement correcting program. The second corrected position data thus corrected is associated with the image 25B and is stored in the storage unit 9.

Collimating direction of the measuring point P1 from the second image pickup point O2 is measured by the azimuth sensor 12, and the collimating direction as measured is stored in the storage unit 9. By the measurement of azimuth, it is now easier to determine as to in which azimuth the image has been taken.

(Step 06) On the image 25B displayed on the display unit 6, a measuring point PB2, which is to be at the same position on the image as the measuring point PA2, is specified by using a touch pen or the like. The measuring point PB2 is positioned on a vertical line of the measuring point PB1. The measuring point P2 is stored in the storage unit 9 as a measuring point PB2 in the image 25B. In case it is wanted to obtain an area, positions on the image corresponding to the measuring point PA3 and the measuring point PA4, i.e. a measuring point PB3 and a measuring point PB4, are specified by using a touch pen or the like on the image 25B in similar manner. The position data of the measuring point PB3 and the measuring point PB4 are stored in the storage unit 9 in similar manner as in the cases of the measuring point PB1 and the measuring point PB2.

(Step 07) It is actually difficult to collimate or to specify so that the measuring point PA1 and the measuring point PB1 or the measuring point PA2 and the measuring point PB2 are precisely aligned with each other. By specifying a window corner or an edge of a building which is to be a feature point easily, it is possible to perform partial image matching. Therefore, a part of the measuring point PA1 and the measuring point PB1 or a part of the measuring point PA2 and the measuring point PB2 on the image 25A and a part of the image 25B are matched respectively as corresponding points, and the relation between the measuring point P1 and the measuring point P2 can be easily obtained.

In case it is wanted to obtain an area, the measuring point P3 and the measuring point P4 to be specified can be obtained in similar manner.

By limiting the relation between the measuring point P1 and the measuring point P2 to be in vertical relation, and in case of an area, by limiting the measuring point P3 and the measuring point P4 to horizontal relation respect to P1 and P2, the matching of image tilting or the like can be considerably simplified.

When the measuring points P2, P3 and P4 are specified at arbitrary positions on the image with respect to the measuring point P1, tilt angle or the like between the two points can be calculated from positional relation on the images. Similarly, by determining absolute coordinate of the measuring point P1, positional relation of the measuring points P2, P3 and P4 can be identified.

(Step 08) The relation between the measuring point P1 and the measuring point P2 can be obtained from the positional relation on the images. A position coordinate of the measuring point P1 can be obtained from: a position coordinate of the first image pickup point O1 and a position coordinate of the second image pickup point O2, a distance L between the first image pickup point O1 and the second image pickup point O2, a distance L1 from the first image pickup point O1 to the measuring point P1, and a distance L2 from the second image pickup point O2 to the measuring point P1. Also, positional relation between the first image pickup point O1 and the second image-pickup point O2 can be obtained. From the position coordinates and the positional relation, a length between the measuring point P1 and the measuring point P2 can be calculated.

Similarly, a length between the measuring point P1 and the measuring point P3 can be obtained. From the length between the measuring point P1 and the measuring point P2 and from the length between the measuring point P1 and the measuring point P3, it is possible to calculate an area enclosed by the measuring points P1, P2, P3 and P4.

By changing the objects to be measured 23 one after another, the above measurement is performed. By storing the measured data in the storage unit 9, geographic data can be collected.

Embodiment 4

Now, description will be given on geographic data collecting including image data with positional data by referring to FIG. 1 and FIG. 11 to FIG. 13.

(Step 01) An image of the object to be measured 23 is taken from the first image pickup point O1. When the image pickup unit 3 is directed toward the object to be measured 23, an image including the object to be measured 23 and surrounding of the object to be measured 23 is displayed on the display unit 6. A certain position on the object to be measured 23 is selected as a measuring point P. It is preferable that the measuring point P is selected as an easily identifiable point, such as a plate attached on a wall surface, a window corner, etc. and the direction of the image pickup unit 3 is determined so that the measuring point P is positioned at the center of the image and that the cursor 38 is aligned with the measuring point P. Then, by operating a button on the operation unit 7, an image 25 of the object to be measured 23 at the first image pickup point O1 is taken. Then, the image 25 is stored in the storage unit 9.

At the same time as acquisition of the image, coordinates (position measurement (X1, Y1, Z1)) of the first image pickup point O1 are measured. In the coordinate measurement, a first position data is acquired by the GPS unit 4. Then the correction information 21 is received by the correction information transmitter/receiver 17. The correction information 21 is transmitted to the radio receiving unit 13 from the correction information transmitter 19. The control arithmetic unit 8 corrects the first position data according to the measurement correcting program and the correction information 21, and a first corrected position data is obtained.

By the azimuth sensor 12, a first azimuth angle with respect to the measuring point P from the first image pickup point O1 is approximately detected, and the first azimuth angle thus detected is stored in the storage unit 9.

The first corrected position data and the first azimuth angle are associated with the image 25 and are recorded in the storage unit 9. For instance, for the association of the first corrected position data and the first azimuth angle with the image 25 is carried out based on association data, which is prepared, for example, by storing set of the first corrected position data, the first azimuth angle and the image 25.

(Step 02) On the display unit 6, also serving as a touch panel, a predetermined range including the measuring point P (preferably, a range with the measuring point P at the center; a rectangular range in FIG. 12) (a×a) is registered as a first template 26).

(Step 03) Moving to a second image pickup point O2, an image of the object to be measured 23 is taken from a different direction. During the procedure to move from the first image pickup point O1 to the second image pickup point O2, the change of azimuth angle is detected by the azimuth sensor 12. An azimuth angle from the first image pickup point to the measuring point P, and approximate moving angle with respect to the measuring point P of which center is the measuring point P are measured at real time. The moving angle is displayed on the display unit 6, and an operator can easily identify how far it is moved with respect to the first image pickup point O1 and the measuring point P.

It is preferable that the position of the second image pickup point O2 is at a certain predetermined angle or more with respect to the first image pickup point O1 and the measuring point P. Therefore, the operator can select an adequate second image pickup point O2 by the moving angle displayed on the display unit 6.

The image pickup unit 3 is directed toward the object to be measured 23 so that the measuring point P is at the center of the image at the second image pickup point O2. A retrieval range 27 (b×b; b>a) is set up on the image under image-taking. Under the condition that a range (a second template 28) corresponding to the first template 26 including the measuring point P in the retrieval range 27 is included, a second image 29 of the object to be measured 23 is taken at the second image pickup point O2. The second image 29 is stored in the storage unit 9 as a stereo image to the image 25.

The measurement by the GPS unit 4 and the correction by the correction information 21 are carried out. Similarly to the first image pickup point O1, an accurate 3-dimensional second corrected position data on the second image pickup point O2 is acquired. The second azimuth angle of the second image pickup point O2 with respect to the measuring point P is detected by the azimuth sensor 12. The second azimuth angle and the second corrected position data are associated with the second image 29 and are stored in the storage unit 9.

(Step 04) Features of the image 25 and the second image 29 are extracted. The processing range (c×c; c>b) where the features extracted may be the entire image or may be the central portion of the image including the first template 26 and the second template 28. The extent of the processing range is adequately determined by giving due consideration on the factors such as processing time. The feature extraction is performed by edge processing using LG filter, SUZAN filter, etc.

(Step 05) The extracted features are mostly intersections and single points, and these are set up as pass points.

(Step 06) Based on the pass points thus set up, magnifications of the image 25 and the second image 29 taken at the first image pickup point O1 and at the second image pickup point O2 and tiltings of the camera are calculated, and relative orientation is performed.

(Step 07) Based on the magnifications at the image pickup points and the tiltings of camera as obtained, the magnifications and the tiltings of camera between the image 25 and the second image 29 are corrected (deviation correction). Based on the image 25 and the second image 29 after deviation correction and on the pass points, stereo-matching is performed.

(Step 08) The images processed by stereo-matching are associated with the position data of the object to be measured 23 and are stored in the storage unit 9.

The position coordinates of the first image pickup point O1 and the second image pickup point O2 and the object to be measured 23 are associated with each other by stereo-matching, as image pickup points and the object for image pickup.

In this case, the azimuth data contributes to approximate identification as to which direction the camera was directed. By taking images of the object to be measured 23 from two directions at two arbitrary positions, geographic data of 3-dimensional image associated with the position of the object to be measured 23 can be easily acquired. Further, the objects to be measured are selected one after another as appropriate, and geographic data of 3-dimensional image associated with the position of the object to be measured is stored in the storage unit 9.

(Step 09) The 3-dimensional image thus acquired is displayed on the display unit 6 by the operator. The geographic data are supplied to a PC via a portable storage medium. Or, the geographic data collecting system 1 is connected with the PC, and the data are transmitted from the geographic data collecting system 1 to the PC. Then, the data are transferred to electronic map via the PC. When the electronic map is already stored in the storage unit 9, the geographic data may be transferred to the electronic map by the geographic data collecting system 1. The electronic map which the geographic data are transferred can be displayed on the display unit 6.

Further, from the images and positional data obtained at the geographic data collecting system 1, it is possible to acquire an image data with 3-dimensional data where each pixel in the image has 3-dimensional data of a ground coordinate system. If the image with the 3-dimensional data is displayed on the display unit 6 and an arbitrary position in the image is specified, 3-dimensional data at the specified position can be acquired. That is, in addition to the 3-dimensional measurement at the first image pickup point O1 and the second image pickup point O2 measured by the GPS unit 4 and in addition to 3-dimensional measurement of the measuring point P based on the measurement result at the image pickup points O1 and O2, it is possible to perform 3-dimensional measurement at an arbitrary point on the image.

(Step 10) The stereo image data and the azimuth data obtained in Step 07 are supplied to the PC via the portable storage medium or by communication means as adequate. By performing stereo-matching of the image 25 and the second image 29, it is possible to acquire 3-dimensional data of the image coordinate system based on one of the image optical axis as reference.

(Step 11) Next, by adding the measured values of the GPS unit 4, the corrected position data obtained based on the correction information 21 and also azimuth data obtained at the azimuth sensor 12, the data are converted to the data of the ground coordinate system.

(Step 12) Each pixel in the image has position data of the ground coordinate system. By specifying an arbitrary point in the image, 3-dimensional data of ground coordinate system can be promptly acquired. By specifying a position or a range on the image displayed on the display unit 6, a distance or an area can be obtained.

In the 3-dimensional data measurement based on the stereo image, positional relation of individual points constituting the image of the object to be measured 23 can be obtained. A coordinate system (image coordinate system) using an optical axis of one of the image 25 and the second image 29 as reference is formed. Based on this image coordinate system, it is possible to perform 3-dimensional display on a 2-dimensional display unit. Because the coordinate system can be easily converted, the coordinate system can be converted to a ground coordinate system used in surveying operation.

Based on the 3-dimensional data of the image coordinate system (Step 10), TIN (triangulation unit) may be prepared, and the 3-dimensional data according to TIN may be acquired by performing the processing such as texture mapping etc. (Steps 13-15).

What is claimed is:

1. A portable geographic data collecting system, comprising a GPS unit for measuring a coordinate position, a distance measuring unit for projecting a distance measuring light and for measuring a distance to an object to be measured, a camera for taking an image in measuring direction, a display unit for displaying the pickup image, an azimuth sensor for measuring the azimuth of said measuring direction an arithmetic unit for calculating a coordinate position of the measuring point based on:
   (a) a first image including said measuring point acquired at a first geographic point by said camera, and
   (b) a second image including said measuring point acquired at a second geographic point by said camera, and a portable housing for accommodating said GPS unit, said distance measuring unit, said camera, said display unit, said azimuth sensor and said arithmetic unit, wherein said arithmetic unit calculates said coordinate position of said measuring point by image matching said first image and said second image by using said measuring point, and from the coordinate position of the first geographic point and the second geographic point measured by said GPS unit, and based on a distance and azimuth from the first geographic point to the measuring point measured by said distance measuring unit and on a distance and azimuth from the second geographic point to the measuring point.

2. A portable geographic data collecting system according to claim 1, wherein a display on a display screen of said display unit is divided into two or more displays and wherein an enlarged view including a measuring point is displayed on at least one display.

3. A portable geographic data collecting system according to claim 1, wherein a display on a display screen of said display unit is divided into two or more displays and wherein at least one display includes an image for indicating measuring direction and/or an image for indicating horizontal state.

4. A portable geographic data collecting system according to claim 1, wherein said azimuth sensor detects change of the angle during moving from the first point to the second point, and said arithmetic unit calculates a moving angle based on the results of detection by said azimuth sensor.

* * * * *